(12) United States Patent
Hadjiharalambous et al.

(10) Patent No.: US 9,768,530 B2
(45) Date of Patent: Sep. 19, 2017

(54) EARTHING CONTACT FASTENING DEVICE

(71) Applicant: Wieland Electric GmbH, Bamberg (DE)

(72) Inventors: Alex Hadjiharalambous, Anjou (CA); Stefan Tluczykont, Rattelsdorf (DE)

(73) Assignee: Wieland Electric GmbH, Bamberg (DE)

( * ) Notice: Subject to any disclaimer, the term of this patent is extended or adjusted under 35 U.S.C. 154(b) by 0 days.

(21) Appl. No.: 15/070,831

(22) Filed: Mar. 15, 2016

(65) Prior Publication Data

US 2017/0141489 A1    May 18, 2017

(30) Foreign Application Priority Data

Nov. 13, 2015    (DE) .................... 20 2015 106 155 U

(51) Int. Cl.
    *H01R 4/66*    (2006.01)
    *H01R 13/648*    (2006.01)
(52) U.S. Cl.
    CPC ....................................... *H01R 4/66* (2013.01)
(58) Field of Classification Search
    CPC . H01R 4/60; H01R 4/643; H01R 4/66; H01R 12/596
    USPC .................. 439/98–100, 607.56, 731, 95
    See application file for complete search history.

(56) References Cited

U.S. PATENT DOCUMENTS

| | | | | |
|---|---|---|---|---|
| 5,480,311 A * | 1/1996 | Luu | .................. | H01R 4/643 439/100 |
| 5,895,292 A * | 4/1999 | Affeltranger | ........ | H01R 13/518 439/607.56 |
| 7,390,979 B1 * | 6/2008 | Johnson | ............... | H02G 3/0691 16/2.1 |
| 7,485,806 B1 * | 2/2009 | Gretz | ................... | H02G 3/0666 174/135 |
| 8,764,485 B2 * | 7/2014 | Hohner | ................ | H01R 9/0527 439/607.42 |
| 9,270,059 B2 * | 2/2016 | Dunwoody | ........ | H01R 13/6593 |
| 9,373,919 B1 * | 6/2016 | Smith | ................... | H02G 3/0683 |
| 2007/0049073 A1 * | 3/2007 | Hill | ......................... | H01R 4/48 439/98 |
| 2012/0276762 A1 | 11/2012 | Hohner et al. | | |
| 2013/0102185 A1 * | 4/2013 | Mulfinger | ............ | H01R 13/516 439/460 |

* cited by examiner

*Primary Examiner* — Abdullah Riyami
*Assistant Examiner* — Thang Nguyen
(74) *Attorney, Agent, or Firm* — Withrow & Terranova, PLLC

(57) ABSTRACT

A fastening device for fastening an earthing contact to a metallic protective tube. The fastening device includes an annular guide eyelet having an end face, a half-shell-shaped fixed clamping jaw which is integrally molded on the end face, and a loose clamping jaw configured to be clamped to the fixed clamping jaw. In an assembled state, the half-shell-shaped fixed clamping jaw and the loose clamping jaw are configured to clamp the metallic protective tube. The fastening device further includes at least one of the half-shell-shaped fixed clamping jaw and the loose clamping jaw comprising a receptacle-forming clamping jaw having an inner surface that forms a receptacle configured to receive the earthing contact.

12 Claims, 5 Drawing Sheets

US 9,768,530 B2

EARTHING CONTACT FASTENING DEVICE

This patent application claims priority to German patent application number 20 2015 106 155.2, filed on Nov. 13, 2015, entitled "FASTENING DEVICE," the disclosure of which is hereby incorporated herein by reference in its entirety.

FIELD OF THE INVENTION

The invention relates to a device for fastening an earthing contact to a metallic protective tube.

BACKGROUND

Metallic protective tubes of this type are also referred to as conduits. Metallic protective tubes or conduits of this type are used in Anglo-Saxon and Asian countries, specifically, however, in North America, on account of corresponding standards. These conduits can be in the form of metal pipes and plastics pipes or metal tubes or plastics tubes. It is especially common for metal tubes to be designed in the manner of corrugated pipes. These are coiled from a metal profile to form a tube and therefore have a helical thread-like outer sheath. Electrical wires are introduced into the conduits, for example for building installation. These wires then lay in the conduits such that they are well protected and are laid in the cable channels of buildings, as a result of which the earth connection is also established.

A protective tube of this type is for example known from the European patent from the applicant having the publication number EP 2 499 705 (U.S. Pat. No. 8,764,485) and the title "electrical plug connector". In this document, the metallic protective tube is indirectly connected to the earthing wire. In this document, specifically a comb-like and fork-like earthing contact are disclosed, the comb teeth or fork tines of which abut the metal tube and the end of which contact facing away from the metal tube has a contact tab in each case which can be contacted by means of a cable lug or the like. The earthing contact is interposed, so to speak, between the metal tube and the actual earthing wire.

SUMMARY

Proceeding therefrom, the object of the invention is to further simplify the design of the earthing contact.

This object is achieved according to the invention by the combination of features in claim 1. The dependent claims contain developments of said invention which are partly advantageous and partly inventive per se.

The basic concept of the invention is to directly contact the outer sheath of the protective tube. For this purpose, the end of the earthing wire is intended to be formed as an earthing contact. The end of the electrical earthing wire, i.e. of the electrical conductor forming the earthing wire, is stabilised for this purpose, for example by applying a wire end ferrule, a ferrule or by ultrasonically compacting the individual contact strands. It is also possible to stabilise the conductor end using other known means and to design them to be as monolithic as possible.

The invention consists in permanently fixing such conductor ends, which are formed as an earthing contact, to the metallic protective tube by means of a fastening device. This fastening device consists for its part of an annular guide eyelet and two half-shell-shaped clamping jaws. One of these clamping jaws is connected to the annular guide eyelet as a fixed clamping jaw. One of the clamping jaws comprises a receptacle for the conductor end which forms the earthing contact. In the final assembled state, the clamping jaws clamp the protective tube and the earthing contact which is placed between one clamping jaw and the protective tube in the manner of two clenched jaws of a set of teeth.

For this purpose, the fixed clamping jaw projects out of the end face of the guide eyelet in the manner of a mandible. This fixed clamping jaw which protrudes out of the guide eyelet in the longitudinal direction in the manner of a mandible approximately forms the lower jaw of the set of teeth and the loose clamping jaw which is placed on top of the fixed clamping jaw when in the final assembled state correspondingly forms the upper jaw.

In a preferred embodiment, the guide eyelet and the fixed clamping jaw are integrally formed. A plastics moulded part is particularly suitable for this purpose.

In a further advantageous embodiment, the outer sheath of the metallic protective tube is in the form of a corrugated pipe. The metallic protective tube thus comprises a helical outer sheath. Ribs are accordingly attached to the inner sides of the clamping jaws and engage, in the final assembled state, in the helical turn which coils upwards in a spiral on the outer sheath of the protective tube.

In a further advantageous embodiment, two or more fixing ribs are provided on the inner sides of the clamping jaws, which each have a rib spacing which corresponds to the lead of the helical turn on the outer sheath of the protective tube.

In a further advantageous embodiment, each of the fixing ribs are divided in two in order to produce a transverse spacing therebetween. The earthing contact can be placed in this transverse spacing such that the transverse spacing acts as a receiving space. If a plurality of fixing ribs are provided on the inner sides of the clamping jaws, the transverse spacings are aligned in the longitudinal direction in order to form a continuous receiving slot for the earthing contact. In a further advantageous embodiment, a receiving groove is moulded into the inner side of the clamping jaw and interconnects the transverse spacings. Once the earthing contact has been assembled, the receiving groove fixes said contact in the receiving groove in an interlocking manner on three sides. Torsion of the earthing contact and therefore of the protective conductor as a result of the two clamping jaws being screwed on is thus effectively prevented. This ensures reliable contacting both of the outer sheath and of the protective conductor, specifically the earthing contact.

BRIEF DESCRIPTION OF THE DRAWINGS

The invention is explained in more detail with reference to the embodiment shown in the drawings, in which.

DETAILED DESCRIPTION

Figure 3:
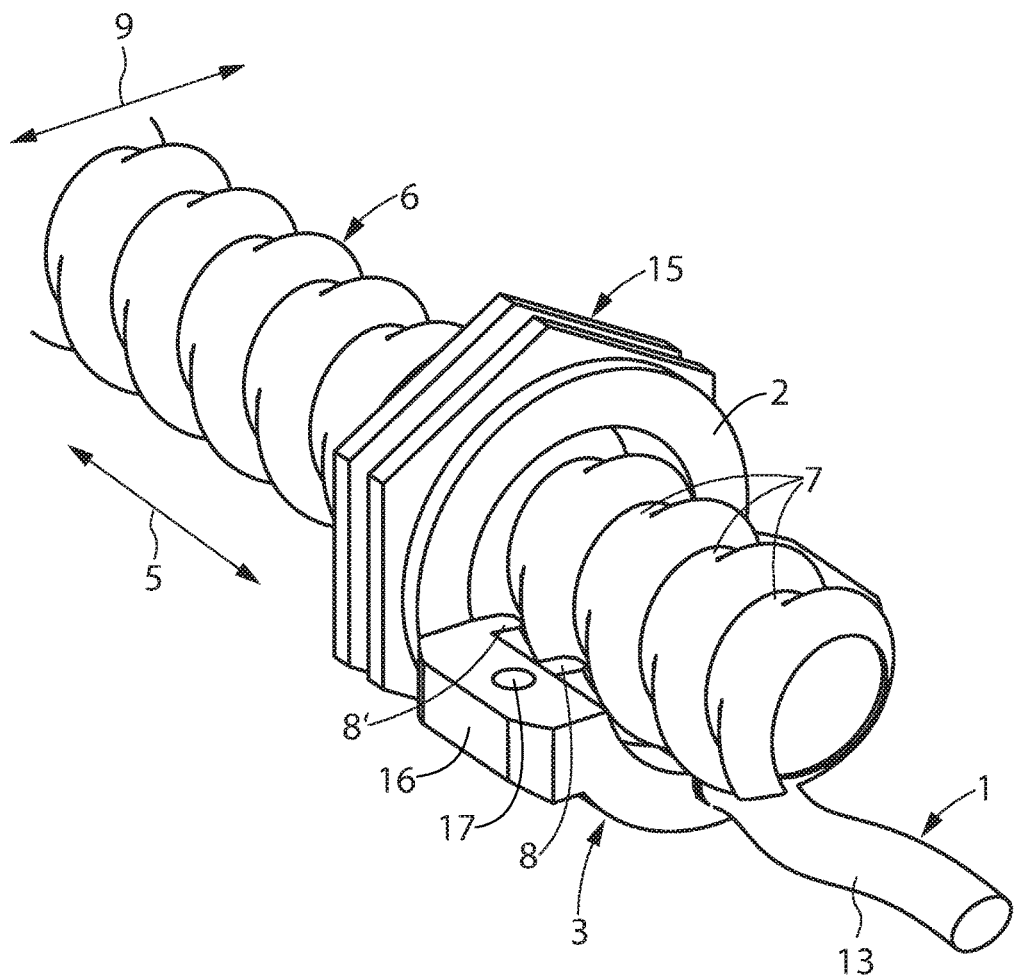
FIG. 3 shows the guide eyelet from FIG. 2 together with the metallic protective tube which is also inserted.
Figure 4:
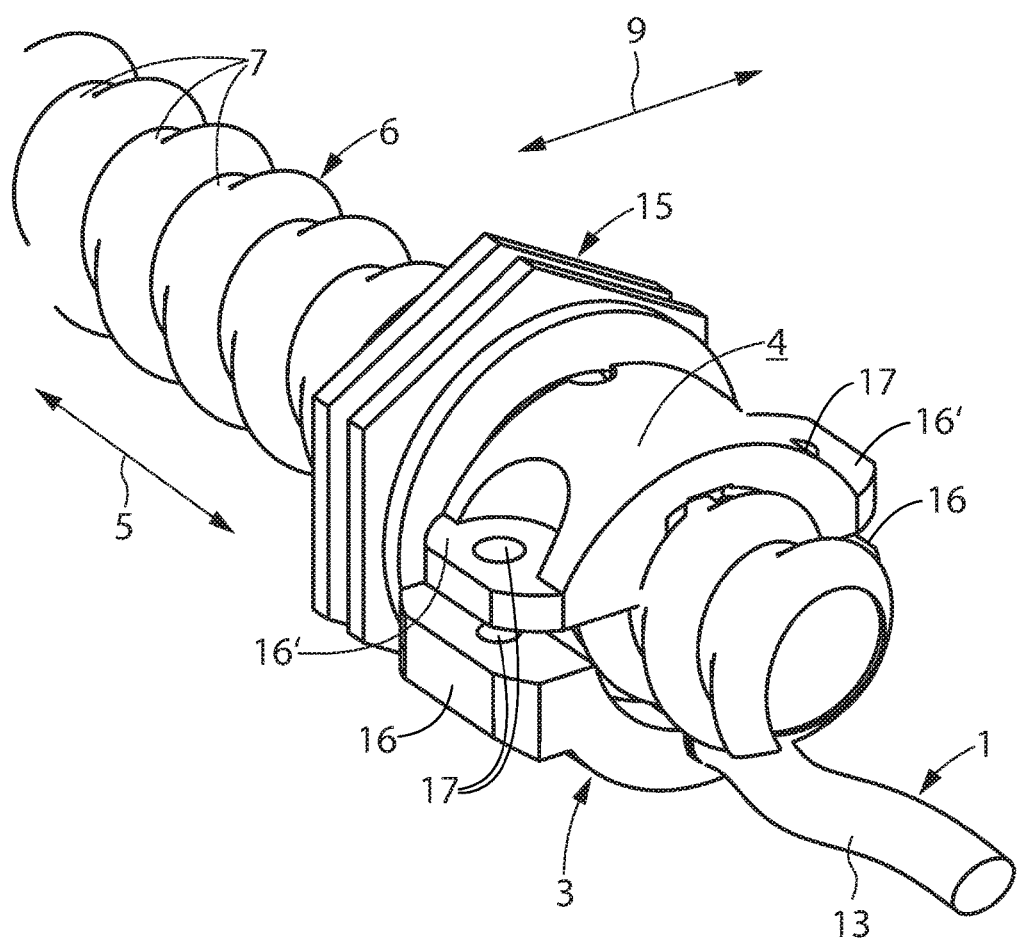
FIG. 4 shows the annular guide eyelet from FIG. 3 together with the preassembled loose clamping jaw.

The claimed fastening device for an earthing contact 1 substantially consists of an annular guide eyelet 2, a halfshell-shaped fixed clamping jaw 3 which is integrally formed on the end face of the guide eyelet 2 in the embodiment and a loose clamping jaw 4 which can be placed on top of the fixed clamping jaw 3. In the embodiment, the fixed clamping jaw 3 projects in the longitudinal direction 5 out of the peripheral end face of the guide eyelet 2. The fixed clamping jaw 3 is in the manner of a panel in order to be able to support the earthing contact 1 and the metallic protective tube 6. As can be seen in FIG. 3 and FIG. 4, the metallic protective tube 6 comprises a helical outer sheath. As a result of this helical shape, a helix is formed in the longitudinal direction 5 along the outer sheath of the protective tube 6. In other words, the outer sheath of the protective tube 6 is wave-shaped. The wave troughs form the helical turn 7 in this case.

The inner side of the fixed clamping jaw 3 supports two fixing ribs 8, 8'. The fixing ribs 8, 8' are divided in two in this case and produce a transverse spacing 20 therebetween approximately in the centre of the inner side of the clamping jaw 3 in the transverse direction 9 which extends at a right angle to the longitudinal direction 5. The receiving groove 10 moulded into the inner side of the fixed clamping jaw 3 extends beneath these two transverse spacings 20 between the rib parts which form the fixed ribs 8, 8' which are divided in two. At the same time, the receiving groove 10 connects the transverse spacings 20 between the rib parts forming the fixing ribs 8, 8' in a line.

The earthing contact 1 consists of a conductor end 12 which is encompassed by a wire end ferrule 11 in the embodiment. The conductor end 12 is the end of an earthing conductor surrounded by an insulating sheath 13. The earthing contact 1 therefore consists of the conductor which is encased by the insulating sheath 13 and the conductor end 12 introduced into the wire end ferrule.

Figure 1:
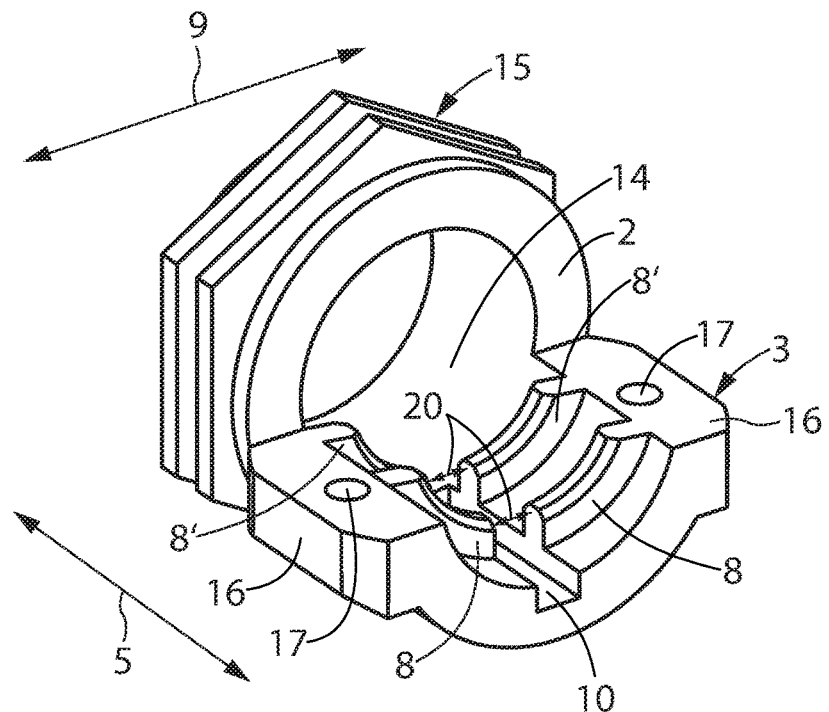
FIG. 1 shows the annular guide eyelet together with the integrally moulded clamping jaw.
Figure 2:
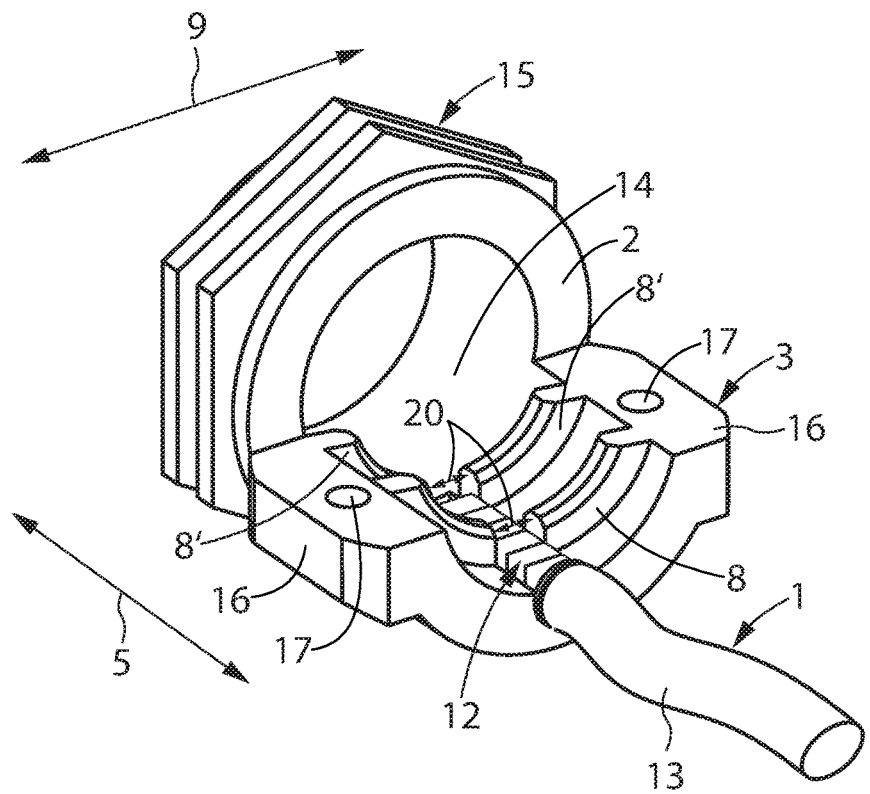
FIG. 2 shows the guide eyelet from FIG. 1 together with the inserted earthing contact.

In the final assembled state, the conductor end 12 together with the wire end ferrule 11 is placed in the receiving groove 10 so as to be held in an interlocking manner, as shown in FIG. 2.

For the purpose of additional assembly, once the earthing contact 1 has been placed in the receiving groove 10, the protective tube 6 in the form of a corrugated pipe is pushed through the inner ring 14 of the annular guide eyelet 2. This is facilitated by the ribs 8, 8' on the fixed clamping jaw 3 engaging in an interlocking manner in the helical turn 7 of the helical outer sheath of the protective tube 6. In order to adapt the guide eyelet 2 to the protective tube 6, the guide eyelet 2 can also be relatively easily screwed on in the manner of a nut along the helical turn 7 by means of the fixing ribs 8, 8' which engage in the helical turn 7. For this purpose, an outer hexagon 15 is provided on the guide eyelet 2 as a driving flat for a ring spanner or an open-ended spanner.

Figure 5:
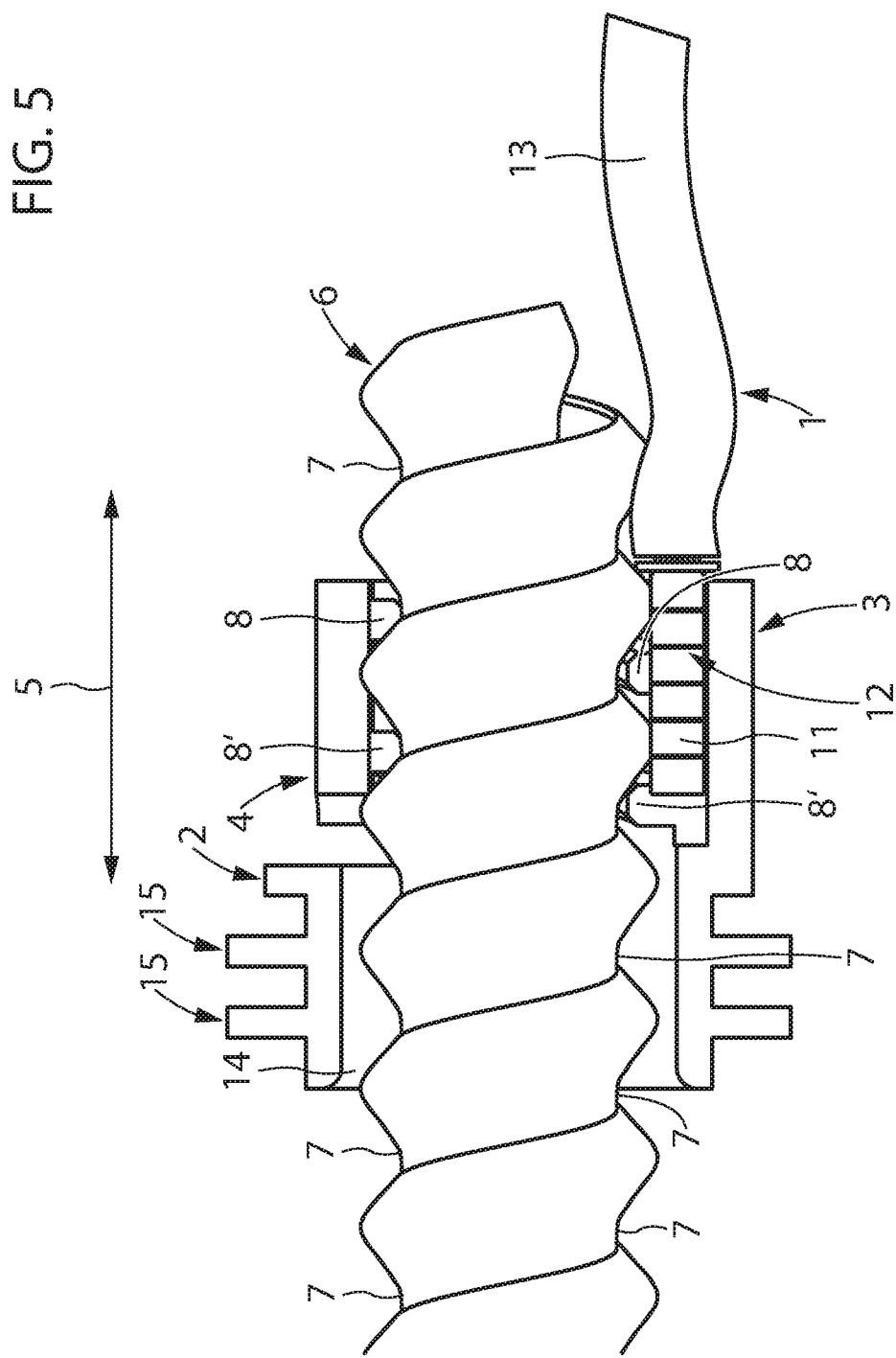
FIG. 5 shows a sectional side view of the fastening device in its finished assembled state.

Since the conductor end 12 of the earthing contact 1 projects upwards out of the inner surface of the inner side of the fixed clamping jaw 3, it can be seen that a frictional connection, i.e. planar contact between the outer sheath of the protective tube 6 and the conductor end 12, is automatically formed. As a result of the groove-like design of the receiving grove 10, the conductor end 12 of the earthing contact 1 is interlockingly protected from torsional forces exerted by the outer sheath of the protective tube 6. The conductor end 12 is therefore placed on the receiving groove 10 in a torsion-proof manner such that it is embedded. For the purpose of final assembly, the loose clamping jaw 4 is placed on the outer sheath of the protective tube 6 such that it is opposite the fixed clamping jaw 3 in a mirror-inverted configuration. The loose clamping jaw 4 also comprises fixing ribs 8, 8' on its inner side, which ribs interlockingly engage in the helical turn 7 of the outer sheath of the protective tube 6. The fixed clamping jaw 3 and the loose clamping jaw 4 comprise flange-like projections 16, 16' on either side thereof, which are penetrated by holes 17. Clamping screws or clamping bolts are inserted into the holes 17 in order to clamp the fixed clamping jaw 3 and the loose clamping jaw 4 against one another in the manner of a pipe clamp, in order to thus fix the protective tube 6 and the conductor end 12 abutting the protective tube 6 in a non-positive manner between the clamping jaws 3, 4. The sectional view in FIG. 5 shows how the earthing contact 1 reliably makes contact with the outer sheath of the protective tube 6 on the outer edges of the helical turn 7.

Figure 6:
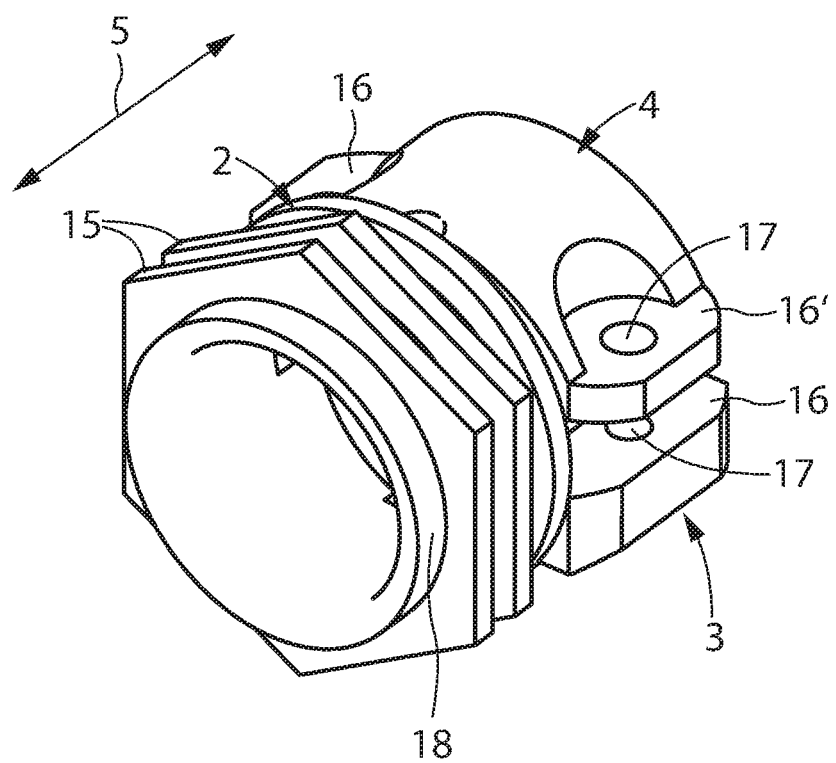
FIG. 6 is a view of the end of the annular guide eyelet facing away from the clamping jaws.

The view in FIG. 6 lastly shows that a guide collar 18 for guiding the protective tube 6 protrudes in the longitudinal direction 5 from the end of the guide eyelet 2 facing away from the fixed clamping jaw 3.

LIST OF REFERENCE NUMERALS

1 Earthing contact
2 Guide eyelet
3 Fixed clamping jaw
4 Loose clamping jaw
5 Longitudinal direction
6 Protective tube
7 Helical turn
8, 8' Fixing rib
9 Transverse direction
10 Receiving groove
11 Wire end ferrule
12 Conductor end
13 Insulating sheath
14 Inner ring
15 Outer hexagon
16, 16' Projection
17 Hole
18 Guide collar

The invention claimed is:

1. A fastening device for fastening an earthing contact to a metallic protective tube, the fastening device comprising:
   an annular guide eyelet having an end face;
   a half-shell-shaped fixed clamping jaw which is integrally moulded on the end face;
   a loose clamping jaw configured to be clamped to the fixed clamping jaw;
   wherein in an assembled state the half-shell-shaped fixed clamping jaw and the loose clamping jaw are configured to clamp the metallic protective tube, at least one of the half-shell-shaped fixed clamping jaw and the loose clamping jaw comprising a receptacle-forming clamping jaw having an inner surface that forms a receptacle configured to receive the earthing contact.

2. The fastening device of claim 1, wherein the half-shell-shaped fixed clamping jaw comprises a first fixing rib and the loose clamping jaw comprises a second fixing rib configured to engage a depression in a helical turn of the metallic protective tube in the assembled state.

3. The fastening device of claim 2, wherein at least one of the half-shell-shaped fixed clamping jaw and the loose clamping jaw comprise at least two fixing ribs, the at least two fixing ribs configured to engage respective depressions in the helical turn of the metallic protective tube in the assembled state.

4. The fastening device of claim 3, wherein the receptacle-forming clamping jaw comprises at least one fixing rib that extends substantially transversely with respect to a longitudinal axis of the fastening device, the at least one fixing rib comprising two first portions spaced apart from one another a distance substantially equal to a width of the receptacle to form a first transverse spacing.

5. The fastening device of claim 4, wherein the receptacle-forming clamping jaw further comprises a second fixing rib, the second fixing rib extending substantially transversely with respect to the longitudinal axis of the fastening device and comprising two second portions spaced apart from one another the distance substantially equal to the width of the receptacle to form a second transverse spacing.

6. The fastening device of claim 5, wherein the receptacle comprises a receiving groove that interconnects the first transverse spacing and the second transverse spacing.

7. The fastening device of claim 6, wherein the half-shell-shaped fixed clamping jaw comprises the receptacle-forming clamping jaw.

8. The fastening device of claim 7, further comprising the earthing contact, the earthing contact disposed in the half-shell-shaped fixed clamping jaw.

9. The fastening device of claim 6, wherein the loose clamping jaw comprises the receptacle-forming clamping jaw.

10. A fastening device for fastening an earthing contact to a metallic protective tube, the fastening device comprising:
   an annular guide eyelet having an end face;
   a half-shell-shaped fixed clamping jaw which is fixed to the end face;
   a loose clamping jaw configured to be clamped to the fixed clamping jaw;
   wherein in an assembled state the half-shell-shaped fixed clamping jaw and the loose clamping jaw are configured to clamp the metallic protective tube, at least one of the half-shell-shaped fixed clamping jaw and the loose clamping jaw comprising a fixing rib that forms a transverse spacing configured to receive the earthing contact.

11. A fastening device for fastening an earthing contact to a metallic protective tube, the fastening device comprising:
   an annular guide eyelet having an end face;
   a half-shell-shaped fixed clamping jaw which is fixed to the end face;
   a loose clamping jaw configured to be clamped to the fixed clamping jaw;
   wherein in an assembled state the half-shell-shaped fixed clamping jaw and the loose clamping jaw are configured to clamp the metallic protective tube, at least one of the half-shell-shaped fixed clamping jaw and the loose clamping jaw comprising a clamping jaw that comprises a first fixing rib comprising two first portions spaced apart from one another to form a first transverse spacing configured to receive the earthing contact.

12. The fastening device of claim 11 wherein the clamping jaw further comprises a second fixing rib comprising two second portions spaced apart from one another to form a second transverse spacing configured to receive the earthing contact.

* * * * *